(12) United States Patent
Odom

(10) Patent No.: US 7,475,593 B2  
(45) Date of Patent: Jan. 13, 2009

(54) HIGH TEMPERATURE NEAR INFRARED FOR MEASUREMENTS AND TELEMETRY IN WELL BOREHOLES

(75) Inventor: Richard Odom, Benbrook, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 113 days.

(21) Appl. No.: 11/166,879

(22) Filed: Jun. 24, 2005

(65) Prior Publication Data

US 2006/0288769 A1    Dec. 28, 2006

(51) Int. Cl.
*E21B 47/01* (2006.01)
*G01S 17/02* (2006.01)

(52) U.S. Cl. ............ 73/152.55; 73/152.03; 73/152.05; 73/152.18; 73/152.21; 73/152.29

(58) Field of Classification Search ............ 73/152.02, 73/152.03, 152.04, 152.05, 152.06, 152.08, 73/152.17, 152.18, 152.19, 152.21, 152.29, 73/152.43, 152.46, 152.54, 152.55

See application file for complete search history.

(56) References Cited

U.S. PATENT DOCUMENTS

| | | | |
|---|---|---|---|
| 5,167,149 A | 12/1992 | Mullins et al. | |
| 5,363,095 A * | 11/1994 | Normann et al. | 340/854.7 |
| 5,729,013 A | 3/1998 | Bergren, III | |
| 6,472,660 B1 | 10/2002 | Hother | |
| 6,627,873 B2 | 9/2003 | Tchakarov et al. | |
| 2002/0121590 A1 * | 9/2002 | Yoshida et al. | 250/208.1 |
| 2005/0269499 A1 * | 12/2005 | Jones et al. | 250/269.1 |

FOREIGN PATENT DOCUMENTS

| | | |
|---|---|---|
| EP | 0 747 569 B1 | 3/2003 |
| EP | 0 846 840 B1 | 3/2003 |
| GB | 2 402 476 A | 12/2004 |
| WO | WO 2004/099564 A2 | 11/2004 |
| WO | WO 2004/099564 A3 | 11/2004 |

OTHER PUBLICATIONS

Encoder Products Company, Model 8025 Stainless Steel Size 20 (2.0"), 2 page specifications ,Rev A Aug. 2004.
Clairex Technologies, Inc., CLD340 specifications, Jan. 2002.
Clairex Technologies, Inc., CLD335 specifications, Mar. 2001.

* cited by examiner

*Primary Examiner*—David A. Rogers
(74) *Attorney, Agent, or Firm*—Wong, Cabello, Lutsch, Rutherford & Brucculeri, LLP

(57) ABSTRACT

A borehole logging system for the measure and the telemetry of properties and conditions of a well borehole environs. The system is embodied to measure fluids within the borehole, to measure high resolution images of the wall of the borehole, to transfer of data to and from equipment operating within the borehole environment, and to determine the status of equipment operating within the borehole. The embodiments are based upon emission, measurement and processing of electromagnetic radiation in the near infrared (NIR) region of the radiation spectrum.

21 Claims, 7 Drawing Sheets

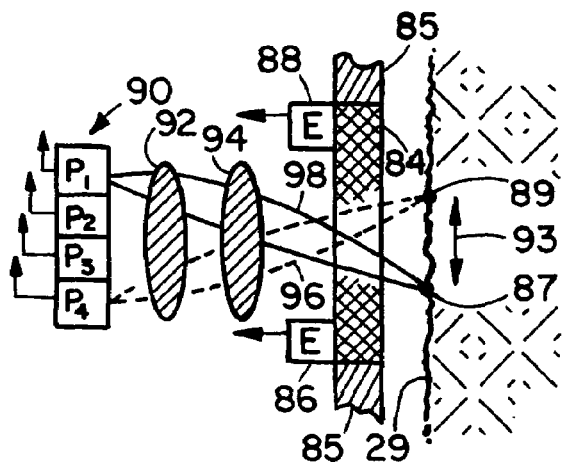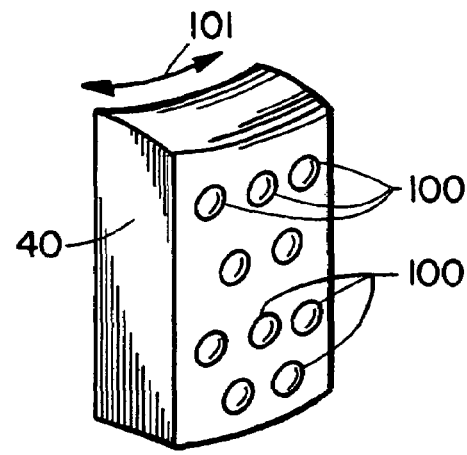
Fig. 8          Fig. 9
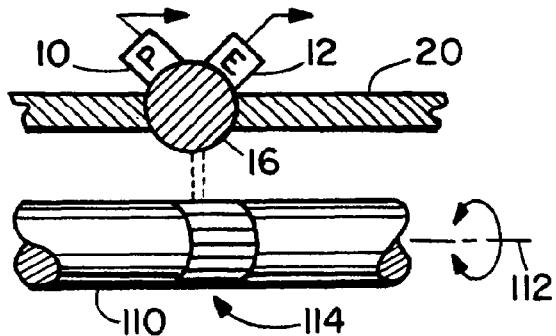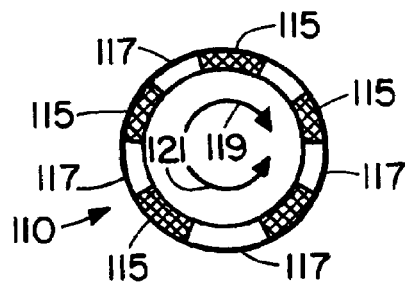
Fig. 10         Fig. 11
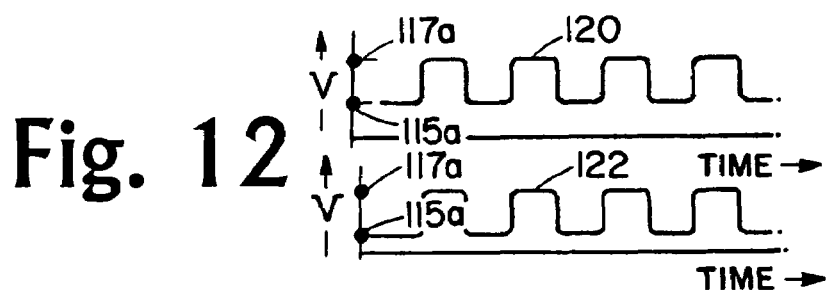
Fig. 12

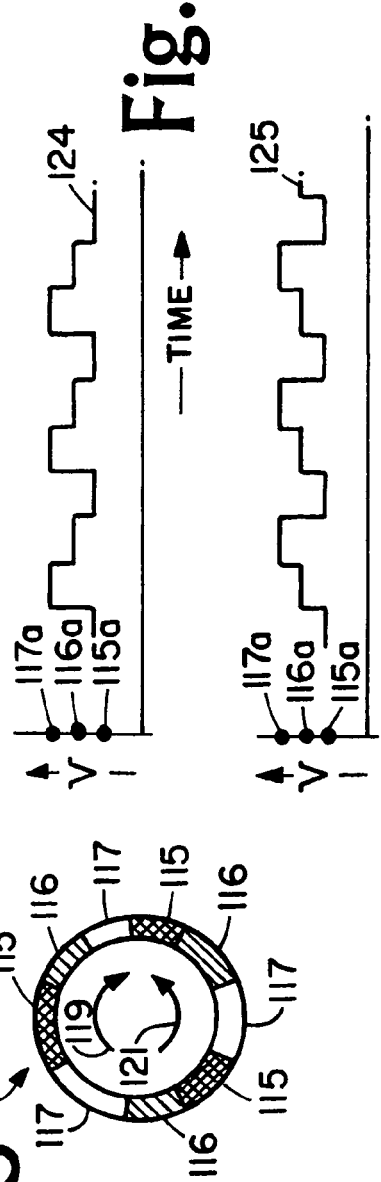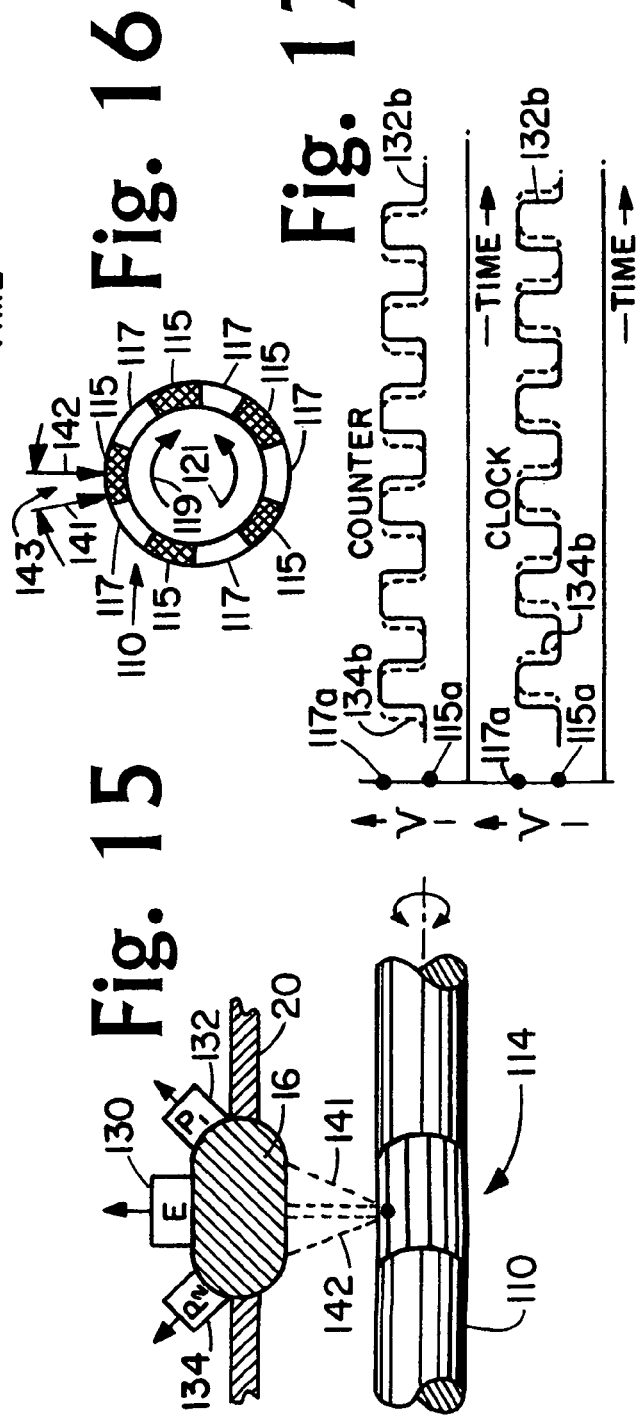

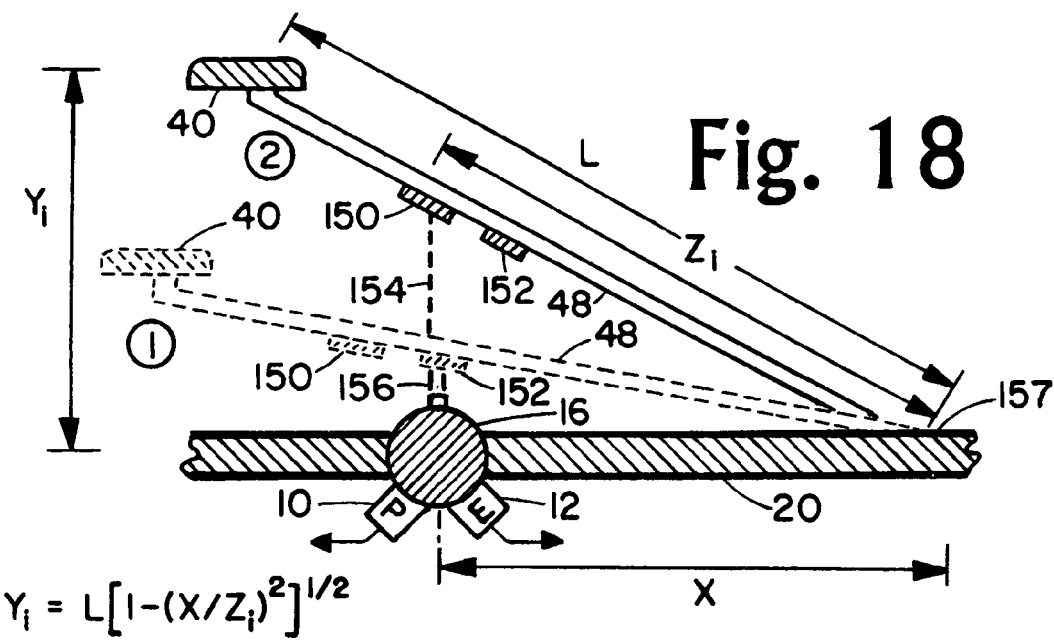
Fig. 18
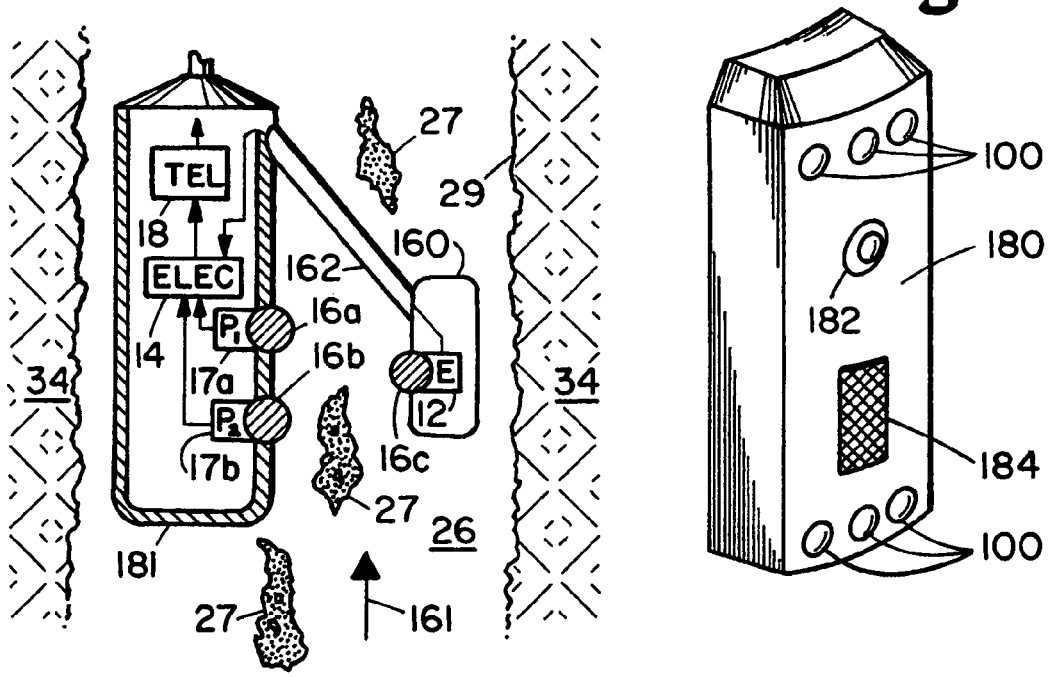
Fig. 19
Fig. 20
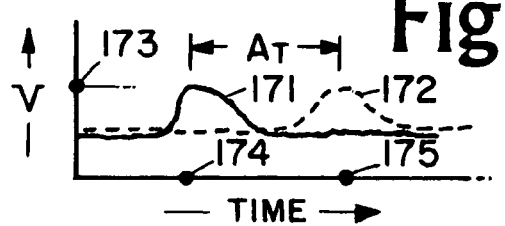
Fig. 21

HIGH TEMPERATURE NEAR INFRARED FOR MEASUREMENTS AND TELEMETRY IN WELL BOREHOLES

This invention is directed toward a borehole logging system for the measure and the telemetry of properties and conditions of a well borehole environs. More particularly, the invention is directed toward measurement of fluids within the borehole, measurement of images of the wall of the borehole, transfer of data to and from equipment operating within the borehole environment, and determination of status of equipment operating within the borehole. The embodiments are based upon measurement and processing of electromagnetic radiation in the near infrared region of the radiation spectrum.

BACKGROUND OF THE INVENTION

Hydrocarbon exploration and production includes the drilling and monitoring operations. Well boreholes are typically drilled in earth formations to identify and to produce fluids from one or more penetrated formations. During the borehole drilling and the formation production phases, borehole pressures and temperatures are typically elevated necessitating the operation of many types of borehole equipment from within hermetically sealed pressure housings. A variety of measurements are made during and subsequent to the drilling of the borehole. Measured or "raw" data can be transferred from the borehole equipment to the surface of the earth for processing and determining parameters of interest regarding the status of the borehole equipment, the borehole fluid, and the formation material penetrated by the borehole. Alternately, some or even all of the raw data processing is performed downhole, and parameters of interest are transferred or telemetered to the surface of the earth. As an additional option, raw and/or processed data can be stored within the borehole equipment for subsequent retrieval at the surface of the earth. Furthermore, control, calibration, operation and other data are often telemetered from the surface of the earth to the borehole equipment.

Some types of borehole equipment utilize apparatus operating outside of a pressure housing and directly in the high temperature and high pressure environs of the borehole. Such equipment includes, but is not limited to, spinners, calipers, pads, actuating arms, and pistons. Verification of proper operation and positioning of these mechanical devices is essential in a wide variety of borehole exploration and production systems.

As mentioned previously, borehole conditions, including temperature and pressure, are typically harsh. This requires the disposition of selected elements of borehole systems within one or more hermetically sealed housings, commonly referred to as "pressure" housings. Measured data can be recorded by data storage means within the pressure housing for subsequent retrieval. As an example, this methodology is used in certain types of logging-while-drilling (LWD), measurement-while-drilling (MWD). Another example of this methodology is a "slick line" well logging system, wherein borehole instrumentation is conveyed within a pressure housing along the borehole by a non-conducting cable. The pressure housing can also be conveyed along the borehole by means of a cable comprising at least one conductor, such as an electrical or fiber optic conductor. A communication link is thereby established between borehole pressure housing and cooperating equipment at the surface of the earth. This methodology of borehole measurement is commonly known as "wireline" logging. Various borehole exploration and production systems require communication across the pressure/fluid interface defined by the wall of a pressure housing and the harsh borehole environment. Communication requirements can comprise exchange of data between two or more borehole pressure housings, communication between one or more borehole pressure housings and the surface of the earth, or both. Examples of such communication requirements are found in a wide variety of borehole exploration and production systems including MWD, LWD, slick-line logging, production monitoring, certain types of wireline systems using mechanical elements exposed to the borehole environment, and the like.

A primary parameter of interest in the testing and monitoring of hydrocarbon wells is the identification and the measure of components of fluid flowing within the borehole. The primary components are liquid hydrocarbon, water, and/or gas, with secondary components including particulate material such as sand. These measurements are made during initial testing and completion of the well, and subsequently throughout the commercial life of the well.

Early wireline and LWD systems were designed to radially penetrate or "see" into the formation to an extent allowed by the basics physics of the particular system. It has also been found that significant information regarding the type of formation fluid, and parameters such as rock mechanics affecting the production of the fluid, can be obtained from very shallow radial measurements including "images" of the borehole wall. Images can be "maps" of a variety of physical properties such as resistivity, density, elemental concentrations, and the like. Certain types of borehole imaging measurements are most effectively made while drilling or subsequent to drilling using LWD and wireline systems, respectively.

SUMMARY OF THE INVENTION

The invention obtains information within a high temperature and high pressure environment using an optical window and one or more high temperature capable radiation emitting diodes and one or more high temperature capable photo diode responsive to the emitted radiation. More specifically, the invention is a borehole system comprising at least one electromagnetic radiation emitter and at least one electromagnetic radiation detector that are embodied to measure information related to properties and parameters of the borehole environs, and information related to operation of downhole equipment. The measured information can also be formatted for transmission between downhole equipment and the surface of the earth. Electromagnetic emitter and detector elements operating in the near infrared (NIR) region of the radiation spectrum have been selected, although many of the basic concepts of the invention embodiments can be implemented using electromagnetic radiation at other regions of the frequency spectrum. Parameters of interest from the borehole environs are obtained from the response of one or more photodiodes (PDs) induced by emissions from one or more infrared emitting diodes (IREDs). It is again emphasized that the invention is not limited to NIR, and emitters and receivers operating at other frequencies can be effectively used.

Both NIR radiation reflectance and transmission techniques are used, depending upon the embodiment of the invention. One or more lenses are used to control the path of NIR radiation between each cooperating IRED and PD. The lens is typically exposed to the borehole environment and possible abrasion of the formation wall. Sapphire is a preferred lens material, since it has an abrasive hardness that is much higher than of typical earth formation material.

The invention can be embodied to measure a wide variety of parameters of interest related to the borehole environs, and to monitor equipment operating within the borehole environs. Some or all of the methodologies of the invention are typically applicable operations while drilling the borehole or subsequent to drilling the borehole, using MWD/LWD and cable conveyed logging systems, respectively. Some of the methodologies are also applicable to pump down memory logging.

As mentioned previously, it is known that significant information regarding the type of formation fluid, and parameters such as rock mechanics affecting the production of the fluid, can be obtained from very shallow radial measurements including "images" of the borehole wall. The invention can be embodied to yield images of the wall of the well borehole from the response of one or more PDs to radiation emitted by one or more IREDs.

The invention can be embodied to monitor borehole apparatus operating outside of a pressure housing and directly in the high temperature and high pressure environs of the borehole. This type of borehole apparatus includes, spinners, calipers, pads, actuating arms, and pistons. An indication of proper operation and positioning of these devices is obtained from the response of one or more PDs to NIR radiation emitted from one or more IREDs, where the PDs and IREDs are disposed within one or more pressure housings.

The invention can be embodied to identify and quantitatively measure components of fluid within the borehole. These measurements are typically made during initial testing and completion, and subsequently throughout the commercial life of the well.

The invention can be embodied in a high data rate telemetry system for LWD/MWD systems. More specifically, a plurality of PD and IRED pairs are disposed within the wall of a "joint" of drill pipe and optically coupled with optical fibers which transmit in the NIR region of the spectrum. The joints of drill pipe are operationally connected to form a drill "string" extending the drill bit and associated borehole equipment to a drilling rig at the surface of the earth. The optically coupled PD and IRED pairs cooperate with a plurality of repeated circuits to form a telemetry link or "data conduit" between surface and downhole equipment. Information transmitted via the data conduit is typically digital communication. The invention can alternately be embodied to retrieve data stored within a downhole storage means. A first pressure housing, commonly referred to as a "fish", is lowered preferably via a wireline or slick line through the drill string and landed in the immediate vicinity of a second downhole pressure housing, such as a drill collar, in which the data are stored. Upon command, data are transferred from the downhole storage means to the fish via a PD-IRED pair. These data are then telemetered to the surface via the wireline. If the fish is conveyed by a slick line, the data are stored in a memory means within the fish for subsequent retrieval at the surface of the earth.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

FIG. 8 illustrates an embodiment of the invention that allows an arc of a two dimensional borehole wall image to be generated without any rotating elements;

FIG. 9 illustrates a non-rotating pad that produces an arc of two dimensional borehole wall image;

FIG. 10 illustrates the invention embodied to detect the rotation of a shaft operating in the borehole environment;

FIG. 11 is a cross sectional view of reflecting elements on the shaft required to obtain the indication of shaft rotation;

FIG. 12 illustrates the output of a PD from which shaft rotation is determined;

FIG. 13 is a cross sectional view of reflecting elements on the shaft required to obtain an indication of direction of shaft rotation;

FIG. 14 illustrates the output of a PD from which direction of shaft rotation is determined;

FIG. 15 illustrates the invention in a second embodiment employing two PDs to detect the direction of rotation of a shaft operating in the borehole environment;

FIG. 16 is a cross sectional view of reflecting elements on the shaft required to obtain an indication of direction of shaft rotation using the embodiment of FIG. 15;

FIG. 17 illustrates the output of the two PDs from which direction of shaft rotation is determined;

FIG. 18 illustrates the invention embodied to determine the position of an arm and a cooperating articulating pad with respect to a pressure housing from which the arm extends;

FIG. 19 illustrates a density pad comprising a plurality PD-IRED-lens assemblies with which pad misalignment and standoff are determined;

FIG. 20 illustrates the invention configured as a fluid flow imager;

FIG. 21 shows outputs of PDs of the flow imager that are used to determine properties of borehole fluids;

DETAILED DESCRIPTION OF THE PREFERRED EMBODIMENTS

Overview of the Invention

As mentioned previously, the invention comprises one or more emitters of radiation which are preferably radiation emitting diodes (EDs). The near infrared (NIR) region of the radiation spectrum has been selected, although many of the basic concepts of the invention embodiments can be implemented using electromagnetic radiation at other regions of the frequency spectrum. Radiation is, therefore, emitted by infrared emitting diodes (IREDs), and detected by one or more photodiodes (PDs) responsive to NIR radiation.

Figure 1:
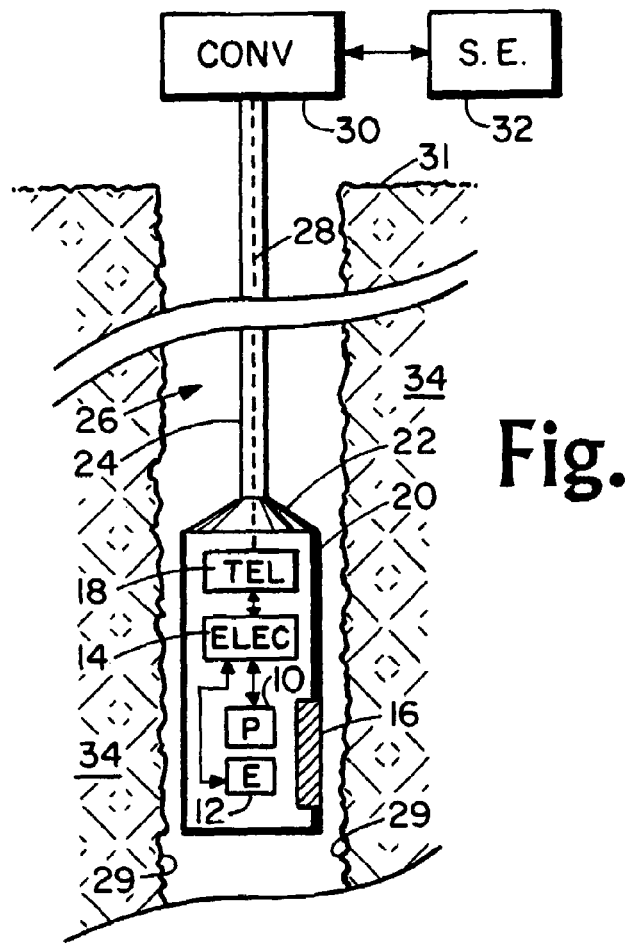
FIG. 1 is a conceptual illustration of the major elements of the invention disposed in a well borehole environment.

FIG. 1 is a conceptual illustration of the major elements of the invention disposed in a well borehole environment. An IRED 12 and a PD 10 are disposed in a pressure housing defined by a wall 20, and operationally connected to an electronics package 14. The electronics package comprises power sources to operate both the IRED 12 and the PD 10. Furthermore, the electronics package comprises control circuitry for the IRED 12 and PD 10, one or more processors for processing and storing response data from the PD, and circuitry to interface with a downhole telemetry unit 18 that is used to transfer data to and from the IRED and PD. The pressure housing comprises material 16 that is transparent to electromagnetic frequencies in which the IRED 12 and PD 10 operate. The preferred frequency is the near infrared (NIR) region of the spectrum. The material 16 can also be fabricated as a lens to focus emitted and received radiation, as will be subsequently discussed in detail.

Again referring to FIG. 1, the pressure housing is suspended within a borehole 26 by a data conduit 24. The borehole 26 penetrates material 34, and is defined by the borehole wall 29. The lower end of the data conduit 24 terminates at a connector 22, which operationally connects to elements within the pressure housing 20. The upper end of the data conduit 24 terminates at a conveyance means 30 at the surface of the earth 31. The data conduit preferably operationally connects to surface equipment 32 through the conveyance means 30. Data are transferred between the downhole system and the surface equipment via the data conduit 24, as illustrated conceptually by the broken line 28.

Still referring to FIG. 1, if the system is embodied as a LWD/MWD system, the data conduit 24 is a drill string and the conveyance means 30 is a drilling rig. If the system is embodied as a logging system, the data conduit 24 is typically a single or multi conductor wireline, and the conveyance means 30 is a cable draw works.

Once again referring to FIG. 1, elements within the electronics package 14 cooperate with the telemetry unit 18 to transmit and receive data via the data conduit 28. Transmission of response from the PD 10 to the surface of the earth 31 is used as an example. The electronics package 14 and telemetry unit 18 cooperate to condition a PD response signal for transmission over the data conduit 28. If the system is embodied as a LWD/MWD system, the telemetry unit 18 is typically a down hole mud pulse unit, a downhole acoustic telemetry unit, or the like. PD response to converted to compatible encoded data and transmitted from the telemetry unit 18 to the surface equipment 32 using techniques known in the art. If the system is embodied as a wireline logging system, the electronics package 14 and cooperating telemetry unit 18 typically convert the PD 10 response to electrical pulses, which are then transmitted by the wireline to the surface equipment 32. Wireline telemetry systems are known in the art. PD response can be transmitted to the surface using additional PDs and IREDs operating at or near the same preferred NIR frequency as the "sensor" PD 10 and "sensor" IRED 12 used to measure a parameter of interest. Once again, the electronics package 14 and telemetry unit 18 condition response from the sensor PD 10 to form an encoded NIR signal. The encoded NIR signal is then transmitted to the surface equipment 32 via the data conduit 28, which comprises one or more pairs of PDs and IREDs operating also at or near a NIR frequency.

Embodiments of this type of telemetry system are discussed in detail in subsequent sections of this disclosure.

Figure 2:
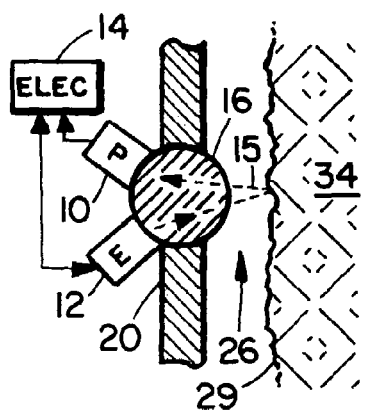
FIG. 2 shows a reflectance assembly, which is an IRED and a PD configured with a cooperating lens in a "reflectance" mode.

The various embodiments of the invention comprise at least IRED and at least one PD. An IRED 12 and a PD 10 configured in a "reflectance" mode are shown in FIG. 2. Both the IRED and the PD are disposed within a pressure housing defined by a wall 20. The IRED 12 and PD 10 are optically coupled to a lens 16, which is preferably fabricated from sapphire and welded into the pressure housing wall 20 thereby forming a hermetic seal. The IRED-PD-lens assembly is referred to as a "reflectance assembly" for brevity. In the reflectance mode shown, NIR light is emitted from the IRED 12, traverses any material within the borehole 26, and is at least partially reflected by the wall 29 of the borehole. A portion of the reflected light is detected by the PD 10. The response of the PD 10, which is input to the electronics package 14 for processing, is indicative of properties of the borehole wall 29 and the penetrated formation 34. Stated briefly, the response of the PD is processed to determine one or more borehole environs parameters of interest. Processing can be performed with a processor (not shown) in the electronics package 14. Alternately, "raw" PD response data can be telemetered to the surface equipment 32 (see FIG. 1) for processing. Yet another option is to store raw PD data within storage means (not shown) within the electronics package 14 for subsequent extraction and processing, or the raw data can be partially processed within the electronics package 14 and telemetered to the surface 31 of the earth for additional processing.

In the context of this disclosure, the term "optically coupled" typically means that two elements are in physical contact with one another in addition to being disposed so that radiation can pass from one element to the other. Any other type of optical coupling, such as the joining two elements with a radiation conduit such as an optical fiber, will be specifically noted.

Figure 3:
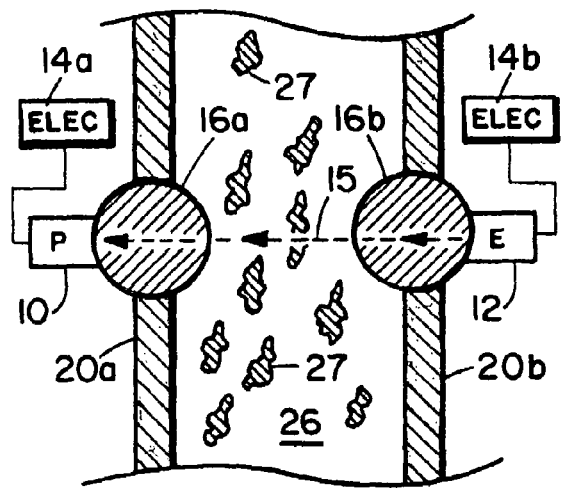
FIG. 3 shows an IRED and a PD configured in a "transmission" mode.

FIG. 3 shows an IRED 12 and an PD 10 configured in a transmission mode. Once again, the IRED 12 and PD 10 are pressure housed. The pressure housing can be a single housing through which borehole fluid can flow, such as a drill collar. The fluid can alternately be stationary. Alternately, two independent pressure housings can be used. Examples of both of these transmission mode configurations are discussed in subsequent sections of this disclosure. The PD 10 is optically coupled to a first lens 16a, which is disposed in a pressure housing wall 20a forming a hermetically seal. The IRED 12 is optically coupled to a second lens 16b, which likewise is hermetically sealed within a pressure housing wall 20b. The PD 10 is powered and controlled by electronics package 14a, and the IRED is powered and controlled by the electronics package 14b. It should be understood that if both IRED 12 and PD 10 are disposed within a common pressure housing, both can be powered and controlled by a common electronics package as shown in FIGS. 1 and 2.

Still referring to FIG. 3, the invention is configures so that borehole fluid passes between PD 10 and IRED 12, and the cooperating optically coupled lenses 16a and 16b, respectively. A two-phase fluid is illustrated conceptually comprising a continuous phase 26 and a discrete phase 27. As an example, the continuous phase 26 comprises liquid and the discrete phase 27 is free gas. NIR radiation emitted by the IRED 12 and detected by the PD 10 is represented conceptually by the broken line "ray path" 15. Absorption properties and reflectance properties of the phases 26 and 27 of the fluid flow affect the amount of NIR radiation impinging upon the PD 10. The response of the PD 10 is, therefore, a function of properties of the fluid and can be related to multiple fluid flow parameters, as will be discussed in a subsequent section of this disclosure.

Referring to FIGS. 1-3, a suitable PD 10 is a high temperature aluminum gallium arsenide (AlGaAs) photodiode CLD340 manufactured by Clairex Technologies, Inc., Plano, Tex., U.S.A. Maximum operating temperature is 225 degrees Centigrade (° C.) with a narrow response range centered at 880 nanometers (nm). The response angle is 90 degrees. A suitable IRED 12 is an efficient, relatively high temperature infrared emitting diode CLE335, again manufactured by Clairec Technologies, Inc. The operating temperature is of the CLE 335 has been tested to 200° C., with a maximum output at 850 nm. Sapphire is the preferred lens material, since it has an abrasive hardness of 9, which is much higher than typical formation material.

Borehole Imaging

The elements of the invention can be configured to produce images of the wall of the borehole based upon the NIR radiation reflectance properties of constituents of the borehole wall.

Figures 4, 5:
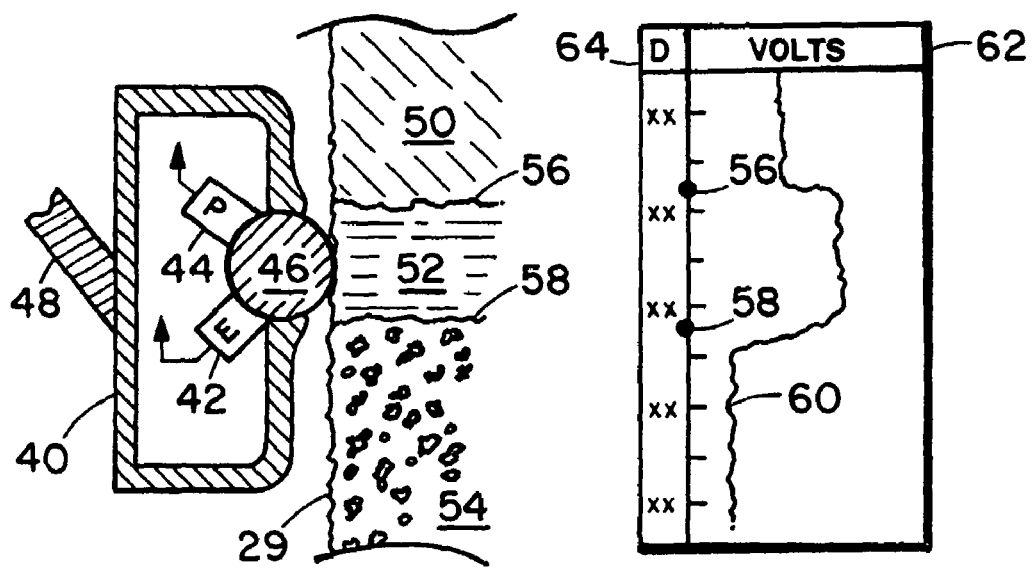
FIG. 4 illustrates an embodiment of the invention for high resolution measurement of properties of the borehole wall responsive to the reflectance of NIR radiation.
FIG. 5 is an example of a high resolution log of reflected NIR radiation from the borehole wall.

FIG. 4 illustrates an embodiment of the invention for high resolution measurement of properties of the borehole responsive to the reflectance of NIR radiation. The embodiment is referred to as a "contact reflectance assembly". The resolution of the property measurement is governed by the area of the lens-borehole wall interface. Image resolution of less than one millimeter is possible. A lens 46 is imbedded in the wall of a hermetically sealed pad housing 40. The pad is urged against the wall 29 of the borehole. The preferred sapphire lens 46 with an abrasive hardness of 9 is much higher than typical formation material and therefore able to withstand abrasive contact with the wall 29 of the borehole. PD 44 and IRED 42 are optically coupled to the lens 46, and disposed so that the PD is responsive to NIR radiation emitted by the IRED and reflected at the borehole wall. For clarity, the electronics package 14 shown in previous Figures has been omitted, with arrows extending from the PD and IRED representing conceptually connections to the electronics package. The electronics required to operate the PD/IRED system is less complex than other imaging systems, such as those based upon the measure of resistivity. For purposes of illustration, the formation is shown to comprise three layers or "zones" 50, 52 and 54 with different NIR radiation reflection properties. Again, for purposes of discussion, assume that zone 52 is the most reflective, zone 54 is the least reflective, and zone 50 is intermediately reflective.

FIG. 5 is a "log" 60 of the response of the PD 44 as a function of depth within the borehole. The ordinate of the log, as illustrated, is depth D as indicated at 64. The abscissa of the log, as shown, is response of the PD 44 with magnitude indicated at 62. The response is in volts. It should be understood, however, that the response can be converted to frequency or any other suitable unit that indicates reflectivity of the borehole wall. It should be noted that the log curve 60 exhibits statistically significant excursions at bed boundaries 56 and 58, indicating significant changes in the material of the borehole wall. Zone 52 shows the greatest reflectance, zone 54 shows the least reflectance, and zone 50 shows an intermediate reflectance.

Figures 6, 7:
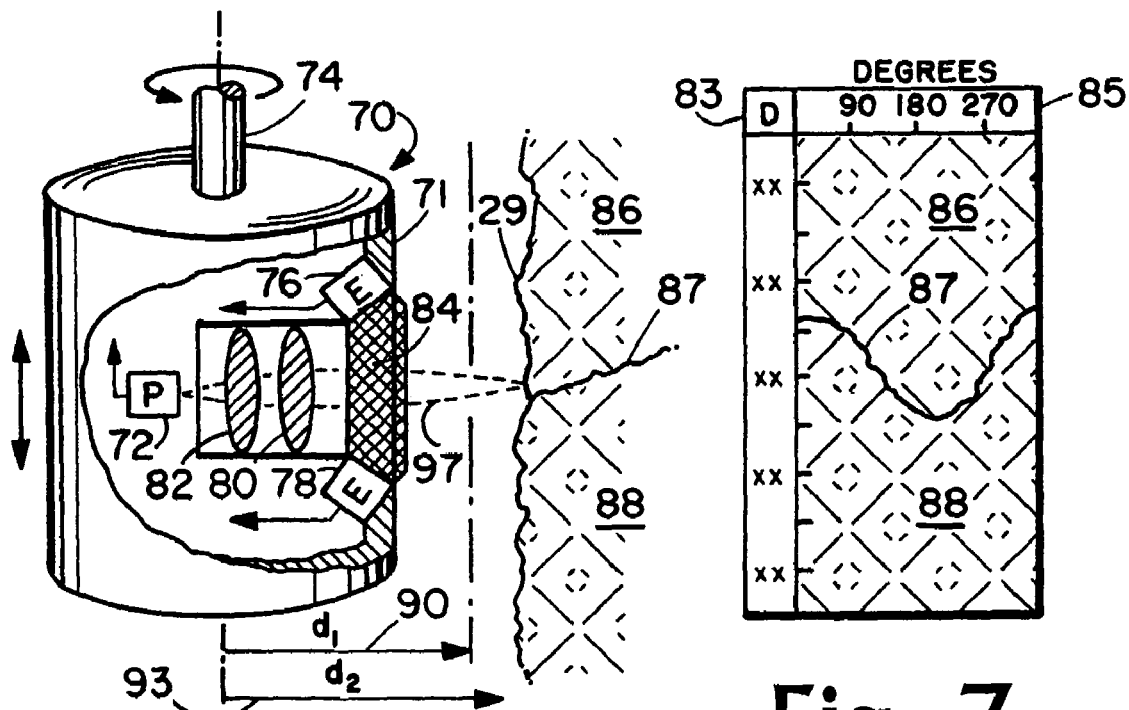
FIG. 6 is a rotating borehole instrument used to measure two dimensional images of the borehole wall around the full circumference of the borehole.
FIG. 7 is an example of a two dimensional log of the borehole wall measured around the full circumference of the borehole.

FIG. 6 depicts a preferably cylindrical pressure housing 70 that is operationally attached to a borehole instrument by means of a shaft 74. The housing 70 is rotated as the borehole instrument, such as a wireline logging tool, is conveyed along the borehole. A cutaway shows interior elements of the pressure housing 70. A "window" 84 of material at least partially transparent to NIR radiation is hermetically sealed to the vertical wall 71 of the pressure housing 70. Two IREDs 76 and 78 are disposed with respect to the window 84 so as to emit NIR radiation into the borehole environs. A portion of this radiation is reflected back through the window 84 as illustrated conceptually with the broken line ray-paths 97. Once the reflected radiation passes through the window 84 and enters the pressure housing 70, one or more lenses focus the radiation upon a PD 72. Two lenses 80 and 82 are illustrated in FIG. 6. As in FIG. 4 and most subsequent Figures, the electronics package has again been omitted for clarity.

Still referring to FIG. 6, the lens system can be set to focus at a predetermined radial position within the borehole. If measurements indicative of the borehole wall 29 are desired, the lens system is focused at a distance 93, which is the expected radial position $d_2$ of the borehole wall 29. For purposes of illustration, the formation comprises an upper zone 86 and a lower zone 88, which are separated by a bed boundary 87 that intersects the borehole wall 29. Alternately, the lens system can be focused at a distance $d_1$ the borehole fluid in the borehole-pressure housing annulus, as indicated at 90. This focusing permits measurements of properties of borehole fluids and particulate material therein. Response readings of the PD 72 are taken at predetermined intervals as the pressure housing 70 rotates and is simultaneously conveyed axially along the borehole.

FIG. 7 is a hypothetical log of a NIR reflectivity image of the borehole wall generated from the response of the PD 72 as the housing is rotated within and conveyed axially along the borehole. As discussed previously, the lens 80 and 82 are set to focus at radial distance $d_2$ as indicated at 93. The ordinate of the log, as illustrated, is again depth D as indicated at 83. The abscissa of the log, as illustrated, represents the azimuthal orientation of the rotating housing 70, and extends from a "reference" 0 degrees through the full rotation of 360 degrees. The PD 72 response is in volts representative of NIR radiation reflectivity, but can be converted to other units, as previously discussed, and represented on the log as by symbol, a gray scale, a color scale and the like, as is known in other types of borehole image logs. As noted in the discussion of FIG. 6, the zones or beds 86 and 88 are dipping with respect to the axis of the borehole. The dipping bed boundary 87 is clearly illustrated in the log of FIG. 7.

FIG. 8 illustrates an embodiment of the invention that allows a two dimensional borehole wall image to be generated without any rotating elements. A pressure housing again comprises a "window" 84 of material that is at least partially transparent to NIR radiation, and is hermetically sealed to the wall 85 of a non-rotating pressure housing 70. The window can be fabricated from sapphire in the shape of a cylinder. Alternate materials fitting the abrasive hardness and radiation transmission criteria are zirconia, spinel, and optical garnet. Two IREDs 86 and 88 are again disposed with respect to the window 84 so as to emit NIR radiation into the borehole environs. Once again, a portion of this radiation is reflected back through the window 84. Once the reflected radiation passes through the window 84 and enters the pressure housing 70, one or more lenses focus the radiation upon an array 90 of PDs. The array can be one or two dimensional. Assume that the PD elements are represented by a m×n matrix, and that m and the n elements are perpendicular and parallel to the axis of the borehole, respectively.

Four PDs are shown in FIG. 8. First assume that FIG. 8 is a view perpendicular to the axis of the borehole. By definition, the array 90 is represented by a (4×1) matrix. Again, two lenses 92 and 94 are shown. The lenses focus reflected NIR radiation on all elements $PD_i$ of the array dependent upon the point of reflection from the borehole wall. Extremes are shown by the ray paths 96 and 98 in FIG. 8. Radiation reflected from point 89 on the borehole wall impinges upon PD$_4$, as illustrated conceptually by the broken ray-paths 96. Radiation reflected from point 87 on the borehole wall impinges upon PD$_1$, as illustrated conceptually by the ray-paths 98. The PD$_2$ and PD$_3$ elements are responsive to reflections from points falling between points 87 and 89. Assuming that FIG. 8 is a perpendicular view, the "arc" 93 between points 87 and 89 are imaged. As the system is conveyed along the borehole, measurements within the arc 93 are made at predetermined depth interval thereby generating a two dimensional image of the borehole wall 29 similar to that shown in FIG. 7, but encompassing the arc 93 rather than the full 360 degree circumference obtained in the embodiment of FIG. 6.

If it is assumed that FIG. 8 is a view parallel to the axis of the borehole, then the array 90 is represented by a (1×4) matrix. Two dimensional images can not be obtained with this embodiment, although "repeat" measurements can be obtained from each PD element within the array 90. These repeat measurements are often useful in correcting PD measurements for a variety of perturbing factors including instrument standoff variations from the borehole wall 29 and changing borehole fluids between the pressure housing wall 85 and the borehole wall 29. Two dimensional images can be obtained with the assumed parallel axis view, along with repeat measurements, if a two dimensional PD array 90 is used. An example would be a 4×4 PD array.

FIG. 9 illustrates a non-rotating pad 40 that produces two dimensional borehole images. The pad comprises an array of PD-IRED-lens assemblies or "reflectance assemblies" 100 of the type shown in FIG. 4. The pad is urged against the borehole wall preferably by means of a hydraulic arm, of the type illustrated in FIG. 4. The assemblies 100 are disposed so that high resolution NIR radiation reflections are measured over the arc 101, with no significant "gaps" in the coverage. The resulting log is again a two dimensional presentation similar to the example of FIG. 7, but encompassing only the radial arc 101 rather than the full circumference of the borehole wall 29 as obtained with the embodiment shown in FIG. 6.

Monitoring of Mechanical Borehole Equipment

The PD-IRED-lens assemblies can be embodied to monitor borehole apparatus operating outside of a pressure housing and directly in the high temperature and high pressure environs of the borehole. As mentioned previously, this type of borehole apparatus includes, but is not limited to, spinners, calipers, pads, actuating arms, and pistons. An indication of proper operation and positioning of these devices is obtained from the response of one or more PDs to NIR radiation emitted from one or more IREDs, where the PDs and IREDs are disposed within the pressure housing.

FIG. 10 shows a shaft 110 that is rotating about an axis 112 in a harsh borehole environment. Rotation can be clockwise or counter clockwise. The shaft contains an array 114 of preferably contiguous reflecting encodings. The array is permanently affixed by etching, fusing or any other suitable means. The shaft 110 is disposed in the vicinity of a pressure housing wall 20 in which a lens 16 is hermetically disposed. PD 10 and IRED 12 are disposed within the pressure housing and optically coupled to the lens 16. NIR radiation is emitted from the IRED 12 and impinges upon the array 114 of reflecting encodings. A portion of the emitted radiation is reflected back through the lens 16 and detected by the PD 10. The amount of reflected radiation is a function of the reflectivity of each element of the array 114 as it rotates past the emitted NIR radiation. Parameters related to the rotation of the shaft can, therefore, be obtained from the response of the PD 10 as a function of time.

It should also be understood that the elements of the shaft can be disposed to indicate linear extension. Linear or axial encoding is discussed in a subsequent embodiment of the invention.

FIG. 11 is a cross sectional view of the shaft 110 at the array 114 of reflecting encodings. The array elements in this embodiment are alternating high reflective elements 117 and low reflective elements 115. As mentioned previously, shaft rotation can be clockwise or counter clockwise, as indicated by the arrows 119 and 121, respectively.

FIG. 12 illustrates conceptually the output of the PD 10 as a function of time as the shaft rotates through the emitted NIR radiation. The ordinate represents PD output in volts, and the abscissa is in units of time. The upper curve 120 represents PD response for clockwise rotation. Output varies between 115a for the low reflective elements 115 to 117a for thew high reflective elements 117. The lower curve 122 represents PD 10 response for counter clockwise rotation. Once again, output varies between 115a for the low reflective elements 115 to 117a for thew high reflective elements 117. Curves 120 and 122 are essentially identical. The direction of rotation can not be determined from the response of PD 10. A variation in PD output does, however, clearly indicate that the shaft 110 is rotating.

FIG. 13 is again a cross sectional view of the shaft 10 at the array 114. In this embodiment, the array elements are sequentially repeating elements of increasing reflectivity. Elements 115 are low reflecting, elements 116 are intermediate reflecting, and elements 117 are high reflecting elements. Although only three degrees of reflective elements are illustrated for brevity and clarity, it should be understood that elements exhibiting more degrees of intermediate reflectivity can be used, with the limit being a sequence of continuous reflectivity "gray" scale elements. Again, the shaft rotation can be clockwise or counter clockwise, as indicated by the arrows 119 and 121, respectively.

FIG. 14 illustrates conceptually the output of the PD 14 as a function of time as the shaft shown in FIG. 13 rotates through the NIR radiation emitted by the IRED 12. Again, the ordinate represents PD output in volts, and the abscissa in units of time. The upper curve 124 represents PD 10 response for clockwise rotation. Output varies sequentially between 117a for the high reflective elements 117, 116a for the intermediate reflective elements 116, and to 115a for the low reflective elements 115. The lower curve 125 represents PD 10 response for counter clockwise rotation. Output now varies sequentially between 115a for the low reflective elements 115, 116a for the intermediate reflective elements 116, and to 117a for the high reflective elements 117. The sequential output curves 124 and 125 of the PD 10 are reversed depending upon the direction of rotation of the shaft. Not only does a variation in PD output indicate that the shaft 110 is rotating, but the direction of rotation can be determined from the sequential variation in the output of PD 10, as illustrated in FIG. 14.

FIG. 15 again illustrates the shaft 110 and array of reflecting encodings 114 rotating about an axis 112 in a harsh borehole environment. Rotation can again be clockwise or counter clockwise. The shaft 110 is again disposed in the vicinity of a pressure housing wall 20 in which a lens 16 is hermetically disposed. IRED 130 is disposed within the pressure housing and optically coupled to the lens 16. NIR radiation is emitted from the IRED 130 and impinges upon the array 114. A portion of the emitted radiation is reflected back through the lens and detected by $PD_1$ 132 and $PD_2$ 134, both of which are optically coupled to the lens 16 preferably on opposite sides of the IRED 130. $PD_1$ and $PD_2$ are disposed on the lens 16 to focus on different radial positions if the array 114, as shown with ray-paths 141 and 142 for $PD_1$ and $PD_2$, respectively. This focal point displacement can better be seen in FIG. 16. As in previous examples, the amounts of reflected radiation detected by $PD_1$ and $PD_2$ are a function of the reflectivity of each element of the array 114 as it rotates past the emitted NIR radiation. Parameters related to the rotation of the shaft can, therefore, be obtained from the response of $PD_1$ and $PD_2$ as a function of time.

FIG. 16 is a cross sectional view of the shaft 110 at the array 114. As in FIG. 11, the array elements are alternating high reflective elements 117 and low reflective elements 115. Arrows 141 and 142 represent the radial focal points of $PD_1$ and $PD_2$, respectively, and show that the focal points are displaced by an arc 143. As mentioned previously, shaft rotation can be clockwise or counter clockwise, as indicated by the arrows 119 and 121, respectively.

FIG. 17 illustrates conceptually the output of the $PD_1$ 132 and $PD_2$ 134 as a function of time as the shaft shown in FIG. 15 rotates counter clockwise through the NIR radiation emitted by the IRED 130. Again, the ordinate represents PD outputs in volts, and the abscissa is in units of time. Outputs from both $PD_1$ and $PD_2$ vary sequentially between 117a for the high reflective elements 117 and 115a for the low reflective elements 115. The solid curve 132b represents the output of $PD_1$ 132, and the broken curve 134b represents the output of $PD_2$ 134. Because of the radial focal points of $PD_1$ and $PD_2$, the curve 134b from PD2 will "lead" the corresponding curve 132b when the shaft is rotating counter clockwise. The reverse situation is seen in the lower two sets of curves, wherein rotation is clockwise and the 132b curve "leads" the 134b curve. Once again, variation in $PD_1$ and $PD_2$ outputs indicate that the shaft 110 is rotating, but the direction of rotation can be determined from the relative displacements of the output curves 132b and 134b. It should be understood that other dispositions of $PD_1$ and $PD_2$ can be employed as long as radial focusing is different thereby allowing direction of rotation to be determined from output curve displacement.

FIG. 18 illustrates the invention embodied to determine the position of an arm 48 and a cooperating articulating pad 40 with respect to a pressure housing 20 from which the arm extends. A lens 16 is hermetically sealed in the wall 20 of the pressure housing, with PD 10 and IRED 12 disposed within the pressure housing and optically coupled to the lens. The arm 48 comprises a plurality of elements of reflecting encodings with differing NIR radiation reflectivity properties, somewhat like the elements of the array 114 in the previously discussed rotating shaft embodiments. Only two elements 150 and 152 are shown for clarity. It should be understood that additional elements can be used to improve precision, with the limit being a continuous reflective "gray" scale.

Still referring to FIG. 18, the arm is shown deployed in two positions, labeled "1" and "2". When deployed in position 1, NIR radiation emitted by the IRED 12 is reflected from the element 152 (as illustrated conceptually with the broken line light path 156) and is recorded by the PD 10. When deployed in position 2, NIR radiation emitted by the IRED 12 is reflected from the element 150 (as illustrated conceptually with the broken line light path 154) and is recorded by the PD 10. The length L of the arm 48 is known. Likewise, the distances $Z_i$ from the arm pivot point 157 is known for each element (i=1,2). The distance X from pivot point 157 to the lens-PD-IRED assembly is known. Therefore, if the reflecting element 150 or 152 can be identified from the output of the PD 10, then the corresponding radial pad extension $Y_i$ (i=1,2) can be computed from the relationship $$Y_i = L(1-(x/Z_i)^2)^{1/2}$$

The reflecting element is identified by the amount of reflected NIR radiation. As an example if element 150 is high reflecting and 152 is low reflecting, a relatively large output from PD 10 indicates that element 110 is in focus, and that the arm is in position 2. Alternately, the reflecting elements can be a series of encryptions such as a bar code thereby providing a direct means for determining the radial position of the arm 48 and articulating pad 40.

The previously discussed position measurements are susceptible to temperature induced errors. As an example, absolute values of Voltage depicted and discussed in association with FIGS. 11, 14 and 17 can not only be a function of reflectance, but can also be a function of temperature. Effects of temperature can be compensated by normalization of these measured values to a reading of a gray scale or etching value preferably obtained with a reference PD-IRED-lens reference assembly.

Pad type borehole instruments are typically designed to operate with the pad positioned directly against and in full contact with the wall of the well borehole. Any misalignment or "standoff" of the pad with respect to the borehole wall can induce error in the measurement for which the instrumentation is designed to make. Pad type density logging is a prime example, wherein misalignment or standoff can induce significant error in density measurements. Misalignments and standoff if known and measured can, however, be used to correct the density measurement.

FIG. 19 illustrates a density pad 180 that comprises a pressure housing containing a source of radiation and a detector of radiation. Radiation is emitted through a window 182 that is relatively transparent to gamma radiation. Emitted radiation interacts with formation material, and a portion of the radiation is backscattered through a detector window 184 where it is recorded by a suitable detector mounted within the pad 180. The pad 180 comprises an array of PD-IRED-lens reflectance assemblies 100 of the type shown in FIG. 4. The assemblies are preferably disposed along the top and along the bottom of the pad, as shown. Output from the PD element of each assembly 100 is compared with outputs from the other assemblies. This comparison is used to determine orientation of the pad. If all outputs are within a predetermined statistical range, it is assumed that all assemblies are reading the same borehole wall material, and that the pad 180 is aligned and is in full contact with the borehole wall. If one but not all assemblies 100 read a value indicative of borehole fluid, then it is assumed that only a portion of the pad is in contact with the borehole wall, and suitable corrections must be made for pas misalignment. If all assemblies 100 read a value indicative of borehole fluid, then it is assumed that the entire pad 180 is standing off from the borehole formation. Suitable corrections for improper pad orientation, such as misalignment and standoff, can be made by calibrating the assemblies under known borehole conditions and by mathematical modeling of the assembly responses to various borehole conditions.

Borehole Fluid Measurements

The invention can be configured to measure various properties of fluid within the borehole such as fluid type and fluid flow velocity. At the wavelengths used with the previously discussed PD-IRED pairs, absorption properties for oil, water and gas differ. As an example, water exhibits a larger absorption than oil or gas. The invention embodied in the transmission rather than the reflectance mode is more desirable to measure properties of borehole fluid.

The embodiment shown in FIG. 3 is suitable for delineating gas from liquid in a flow stream. To review, FIG. 3 shows an IRED 12 and a PD 10 configured in a transmission mode, and disposed within a pressure housing through which borehole fluid flows, such as a drill collar. By definition of the transmission mode, IRED 12 and a PD 10 are on opposite sides of the fluid flow so that borehole fluid passes between PD 10 and IRED 12, which are optically coupled lenses 16a and 16b, respectively. A two-phase fluid is illustrated conceptually comprising a continuous phase 26 and a discrete phase 27. As an example, the phase 26 comprises liquid and the phase 27 is free gas. NIR radiation emitted by the IRED 12 and detected by the PD 10 is represented by the broken line ray path 15. Absorption properties of the phases of the fluid flow affect the amount of NIR radiation impinging upon the PD 10. As the gas phase 27 increases, absorption decreases. NIR radiation measured at the PD 10 therefore increases with increasing gas content. Stated another way, the volumetric phase composition of the fluid can be related to the amplitude of the PD output.

Again referring to FIG. 3, linear flow velocity can be determined with a second PD-IRED pair (not shown) axially displaced a distance "d" from the illustrated pair. If the multiphase flow comprising components 26 and 27 is not homogeneous, characteristic response "signatures" are produced in the outputs of the PD 10 and the second PD (not shown) displace a distance d from PD 10. By correlating in the response signatures, the amount of time required for a non homogeneous component to travel the distance d can be determined. Since d is a known quantity and travel tine is measured, linear velocity of that phase can be determined. The use of two PD-IRED pairs is discussed further in the following section of this disclosure.

FIG. 20 illustrates the invention configured as a fluid flow imager disposed within a borehole defined the borehole wall 29 and penetrating formation 34. A first pressure housing 181 contains first and second PDs ($PD_1$ and $PD_2$) 17a and 17b optically coupled to lenses 16a and 16b, respectively. The lenses 16a and 16b are hermetically sealed in the wall of the first pressure housing 181 and axially displaced a distance "d" from one another. PDs 17a and 17b are operationally connected to the electronics package 14 for power and control. Responses from both PDs are preferably telemetered to the surface of the earth via the downhole telemetry unit 18. A second pressure housing 160 is radially displaced from the first pressure housing 181 by means of an arm 162. The second pressure housing 160 comprises an IRED 12 optically coupled to a lens 16c that is hermetically sealed in the wall of the second housing. Borehole fluid comprising a first phase 26 and a second phase 27, flows within the borehole between the first and second pressure housings. For purposes of illustration, flow is upward as illustrated by the arrow 161.

Still referring to FIG. 20, it will be assumed that the continuous phase 27 of the fluid is liquid, and that the discrete phase 27 of the fluid is free gas. Since the NIR radiation absorption of the gas phase is less than that of the liquid phase, the outputs of both PD 16a and 16b, integrated over time, increases as the fraction volume of gas, $P_G$, increases. Conversely, the outputs of both PD 16a and 16b, integrated over time, decrease as the fractional volume of liquid, $P_L$, increases, where $P_L=1-P_G$. To summarize, the fractional volumetric phases of the fluid can be obtained from V, the magnitude of the measured PD outputs in volts, when the system is calibrated under known conditions.

Again referring to FIG. 20, the passage of a discrete "pocket" or "bubble" of gas between the IRED 12 and the PDs 17a and 17b will result in short excursions in time in the outputs of both PDs. This effect is illustrated conceptually in FIG. 21. Curve 171 is the response of PD 17b, in volts, plotted as a function of time. Curve 172 is the response of PD 17a, in volts, plotted as a function of time. Since the fluid flow is upward within the borehole as indicated by the arrow 161, the passage of a pocket of gas 27 past PD 17b is first indicated as an increasing excursion in the curve 171, as indicated at time 174. As the pocket moves upward past PD 17a, a similar excursion is observed in the curve 172 at a time 175. Since ΔT, the difference in times 174 and 175 is measured by time correlating the curves 171 and 172, and an axial spacing S between the PDs 17b and 17a is known by tool design, then the linear flow velocity $v_G$ of the gas phase is determined from the relationship $$v_G = S/\Delta T$$

If it is assumed that the linear flow velocity $v_L$ of the liquid phase 26 is the same as the linear flow rate $v_G$ of the gas, then the volume flow rates of rates of liquid and gas, $Q_L$ and $Q_G$, respectively, are determined from the relationships $$Q_L = QP_L v_L$$

and $$Q_G = QP_G v_G$$

where Q is the total fluid flow rate.

Data Transfer Methodology

As mentioned previously, joints of drill pipe are operationally connected to form a drill "string" extending from a drill bit and associated downhole equipment to a drilling rig at the surface of the earth. The drill string can serve as telemetry link or "data conduit" between equipment at the surface (as shown at 32 of FIG. 1) and the downhole equipment. For LWD and MWD systems, the invention can be embodied within the drill string to operate as a means for telemetering data at a high rate between LWD/MWD borehole instrumentation and equipment at the surface of the earth.

Figure 22:
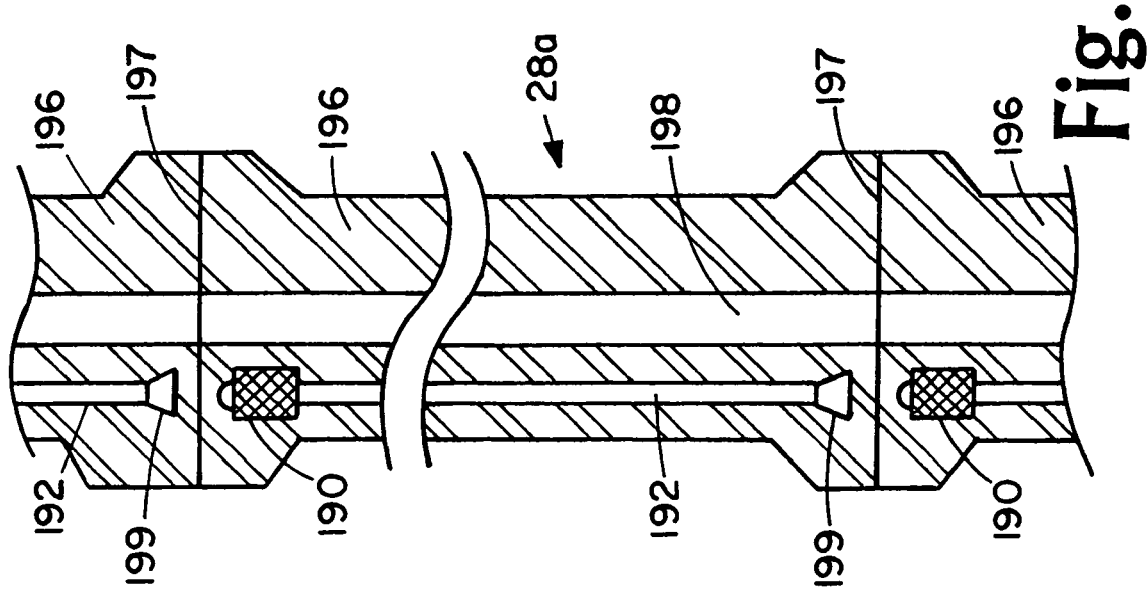
FIG. 22 shows the invention embodied in a LWD/MWD telemetry system.

Attention is directed to FIG. 22, which illustrates a section of drill string 28a comprising sections "joints" of drill pipe 196 that are connected at collar connections 194. One or more optical fibers 192 are disposed within the wall of each joint of drill pipe. Preferably a plurality or "bundle" of optical fibers are used. One end of the fiber bundle 192 is terminated by a repeater 190 comprising an IRED, a PD and a power source. The opposing end of the bundle 192 is terminated by a collector assembly 199, which receives preferably NIR radiation from an adjacent repeater. The collector assembly comprises a lens or the like to receive and focus the NIR radiation as required. The repeaters 190 are optically aligned with the adjacent collector assembly 199 preferably by means of an alignment pin (not shown) at the joint 194. Details of the repeater will be discussed in a subsequent section of this disclosure.

Referring to both FIGS. 1 and 22, the lower end of the drill string mechanically and operationally connects through the connector 22 to downhole equipment 20 containing previously discussed sensors, electronics and a downhole telemetry unit 18. The collector assembly of the lower most joint 196 of the drill string 28 receives data, via the downhole telemetry unit 18, from the downhole sensors in the form of encoded data pulses of preferably NIR radiation. That is, output from the telemetry unit 18 is encoded NIR radiation representing sensor response. The encoded NIR data pulses are transmitted up the fiber optic bundle 192 where they are received by the terminating repeater 190. The repeater amplifies and transmits the encoded data pulses across the joint 194 and to the next adjacent collector assembly 199. This sequence is repeated until the encoded data pulses reach the surface of the earth and are received by a surface telemetry unit (not shown) which preferably resides in the surface equipment 32.

Figure 23:
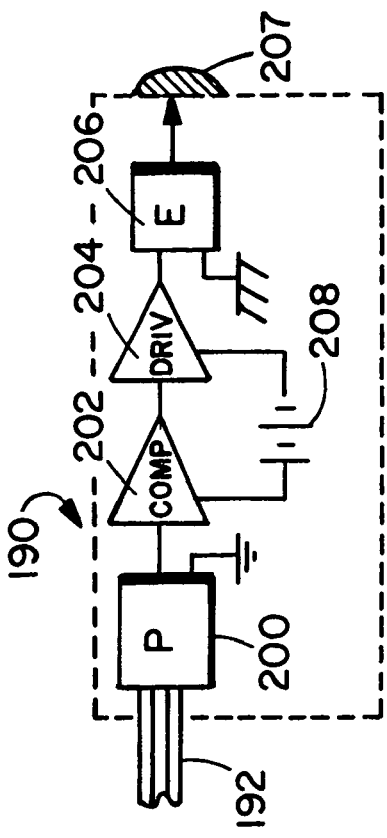
FIG. 23 shows details of repeaters used in the MWD/LWD telemetry system shown in FIG. 22.

FIG. 23 illustrates details of the repeater 190. Data in the form of the encoded NIR radiation enters the repeater 190 and is received by PD 200. Output of the PD 200 is passes through a comparator 202 and a driver 204, and is input into an IRED 206. Output of the IRED 206 is the amplified encoded NIR radiation that passes through a lens 207 and across the joint 194 and into the adjacent collector assembly (see FIG. 22).

The telemetry system illustrated in FIGS. 22 and 23 is configured to transmit data from downhole to the surface. If it is desired to transmit data from the surface downhole, the elements of the telemetry system must be reversed, with the repeater 190 terminating the lower end of the fiber optic bundle 192, and the collector assembly 199 terminating the upper end of the fiber optic bundle.

Again referring to FIGS. 23 and 22, the repeaters 190 are each powered by a battery 208. The power required to operate the repeaters must be supplied locally since it is not possible to supply enough power directly from either surface or downhole equipment through the optical coupling of the telemetry system. The batteries are preferably selected to be commensurate with the overall drilling operation. The drill bit terminating the LWD/MWD borehole equipment wears as the well is drilled and, therefore, must occasionally be replaced. A new drill bit lasts for typically two to four days depending on the characteristics of the formation material penetrated by the drill bit. The drill pipe and bit is removed from the well in order to replace the worn bit. This is commonly referred to as a "bit trip". It is, therefore, highly desirable from an operational viewpoint that the batteries operate at full power between bit trips.

High-temperature lithium batteries have been used as a source of power for circuits operated within a borehole environment. Recent technology advances by lithium battery manufacturers have resulted in increased energy density in the smaller battery case sizes, while maintaining the battery terminal voltage at +3.9 Volts and still providing high temperature operation. A battery meeting these criteria is the size AA lithium battery manufactured by Tadiran Batteries, Ltd. The energy density of this type of AA battery is typically two Watt-hours. This single AA battery contains enough energy to operate an IRED transmitter and PD receiver circuit, as shown in FIG. 23, for a time interval that is sufficiently long to provide intermittent communication (typically 512 to 1024 baud) in the repeaters 190 between average drill pipe bit trips in the oil and gas industry. This allows the AA batteries powering the repeaters 190 to be replaced during routine drill bit replacement.

Figure 24:
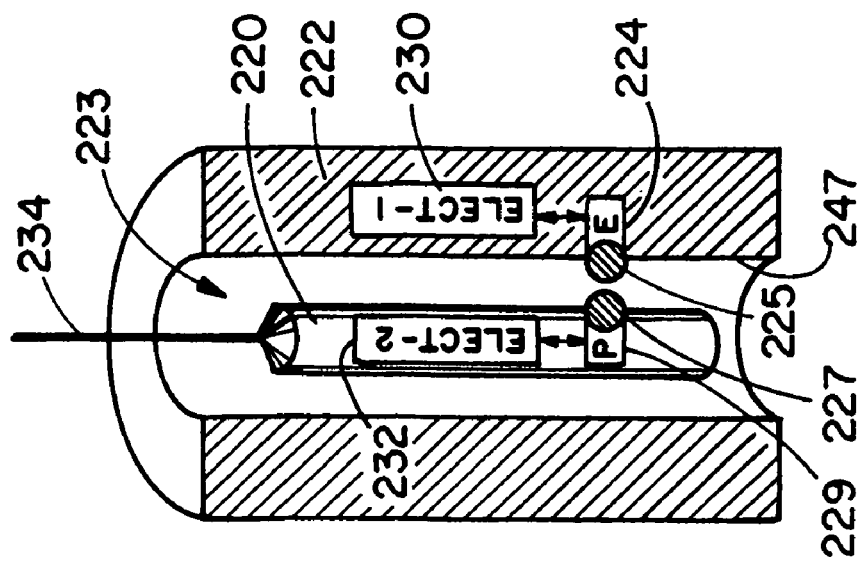
FIG. 24 shows the invention incorporated in a drill collar and a fish, wherein data can be transferred between the collar and the fish.

FIG. 24 illustrates another embodiment of the invention that can be used to transfer data to and from downhole MWD or LWD instrumentation. The structure 222 is a downhole pressure housing comprising a borehole tubular, such as a collar, comprising a conduit 223 through which drilling fluid flows. A lens 225 is hermetically sealed in the inner wall 247 of the conduit 223. An IRED 224 is disposed within the collar 222, optically coupled to the lens 225, and operationally connected to a downhole electronics package 230. The electronics package 230 comprises storage means for data. These data can comprise either response measured by sensors (not shown) within the collar, operational data in the form of instructions or calibrations supplied from the surface, or both.

Still referring to FIG. 24, a second pressure housing 220 is shown as being lowered through the conduit 223 by means of a slick line or wireline 234. This second pressure housing is commonly referred to as a "fish". A lens 227 is hermetically sealed in the wall of the fish 220. A PD 229 is disposed within the fish 220, optically coupled to the lens 227, and operationally connected to a fish electronics package 232. The fish electronics package also comprises storage means for data. The lens 227 of the fish is axially and optically aligned with the lens 225 of the collar. Data from the telemetry unit 18, in the form of encoded NIR radiation, is then transferred from the downhole electronics package 230 of the collar 222 to the fish electronics package 232 of the fish 220 via the PD-IRED-lens system discussed previously in detail. Data transferred to the fish can be converted for storage, and subsequently extracted from the fish electronics 232 at the surface of the earth. Alternately, if the conveyance means 234 is a wireline, data transferred to the fish electronics package can be conditioned and telemetered directly to the surface via a wireline telemetry system (not shown). It should be noted that if the positions of the IRED 224 and the PD 229 are reversed, data can be transferred from the fish 220 (and thus from the surface of the earth) and into the collar 222.

An alternate embodiment (not shown) comprises two IRED/PD pairs with both an IRED and a PD disposed in the fish and in the collar, and with each pair optically and axially aligned to permit two-way communication between the fish and the collar. Stated another way, the second pair would be disposed with the second PD in the collar and the second IRED in the fish.

Figure 25:
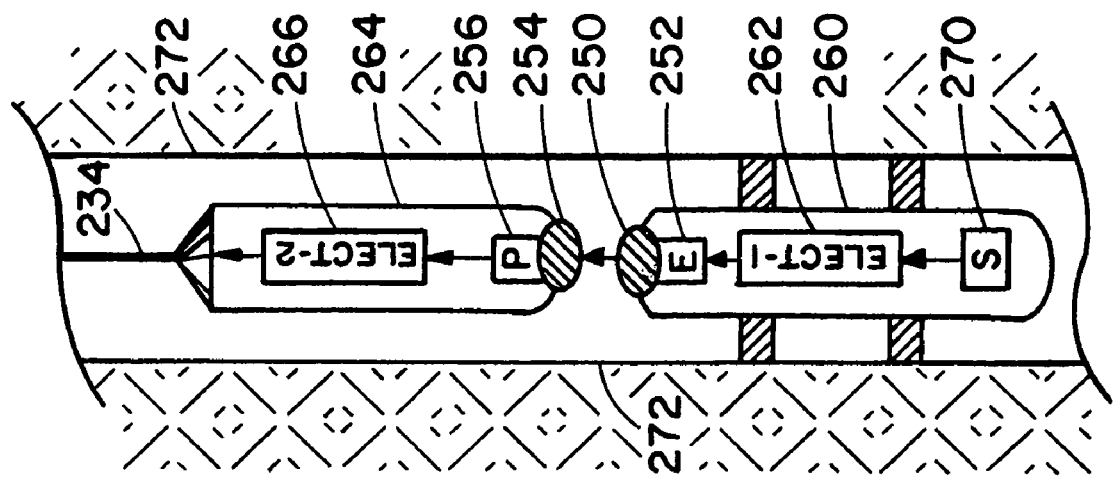
FIG. 25 shows the invention incorporated in a pump down memory tool and a fish, wherein data can be transferred between the pump down memory tool and the fish

The basic concept of data transfer shown in FIG. 24 can be expanded to transfer data in pump down logging systems, memory logging systems, and borehole monitoring systems that are disposed at a fixed location within the borehole. Embodiments of this type is shown conceptually in FIG. 25. A pump down tool comprising a first pressure housing 260 is shown disposed in a tubular 272, such as the casing of a well borehole. Parameters of interest are measured with a sensor 270. These parameters of interest are stored in a memory means contained in a first electronics package 262. A fish, conveyed by a slick line or wireline 234 and comprising second pressure housing 264, is shown disposed in the vicinity of the pump down tool 260. Measures of the parameters of interest are formatted in the form of encoded signals by the electronics package 262. These encoded signals are then transferred from the downhole electronics package 262 to an IRED 252 that is optically coupled to a lens 250 hermetically sealed in the wall of the first pressure housing 260. Measured parameters of interest, now in the form of encoded NIR radiation, are transmitted through borehole fluid where they are received by a PD 256 optically coupled to a lens 254 that hermetically sealed within the second pressure housing 264. This encoded NIR radiation is processed within the electronics package 266 of the fish so that it can either be stored within memory means of the electronics package 266 for subsequent retrieval, or alternately formatted to be telemetered to the surface by the cable means 234. Stated briefly, stored data can be extracted from the memory logging tool 260 and transferred to a second pressure housing 264 as long as the lenses 250 and 254 can be optically aligned.

As another example, the pressure housing 260 can be a permanent well flow monitoring apparatus that is disposed within the borehole casing 272 at a permanent depth. The well flow monitor apparatus measures and stores borehole fluid flow data as a function of time. Such fluid flow responsive devices, configured as logging systems, have been discussed previously in this application. The stored fluid flow data can be subsequently extracted from the memory of the permanent well flow monitor apparatus by means of the fish comprising the second pressure housing 264, using previously discussed methodology.

SUMMARY

The invention is a borehole measurement and transmission system comprising at least one electromagnetic emitter and at least one electromagnetic receiver embodied to (a) measure properties and parameters of the borehole environs, (b) monitor operation of downhole equipment, and (c) transmit data between downhole equipment and the surface of the earth. Elements operating in the near infrared (NIR) region of the radiation spectrum are preferred, although many of the basic concepts of the invention embodiments can be implemented with electromagnetic radiation in other spectral region. It should be noted that many of the embodiments of the invention can be used simultaneously. As an example, the micro imaging embodiment can be used along with the arm position monitor embodiment to insure proper pad contact with the borehole wall.

While the foregoing disclosure is directed toward the preferred embodiments of the invention, the scope of the invention is defined by the claims, which follow.

What is claimed is:

1. Apparatus for measuring a property of a borehole environs, the apparatus comprising:
   (a) a pressure housing;
   (b) at least one reflectance assembly comprising
      (i) a lens hermetically sealed within a wall of said pressure housing,
      (ii) an IRED disposed within said pressure housing and optically coupled to said lens, and
      (iii) a PD disposed within said pressure housing and optically coupled to said lens, wherein said PD responds to radiation emitted by said IRED and reflected from said borehole environs; and
   (c) said property is determined from said response; wherein
   (d) said lens of said at least one reflectance assembly contacts a borehole wall of said borehole environs, wherein resolution of said response is defined by an area of said lens and said borehole contact.

2. The apparatus of claim 1, wherein:
   (a) said pressure housing comprises a pad;
   (b) a plurality of said reflectance assemblies are disposed on a face of said pad;
   (c) multiple responses of each PD in said plurality of reflectance assemblies are determined as said pad is conveyed along said borehole wall; and
   (d) said responses are combined to form a two dimensional image of an arc of said borehole wall as said pad is conveyed along said borehole wall.

3. Apparatus for measuring a property of a borehole environs, the apparatus comprising:
   (a) a pressure housing;
   (b) at least one reflectance assembly comprising
      (i) a lens hermetically sealed within a wall of said pressure housing,
      (ii) an IRED disposed within said pressure housing and optically coupled to said lens, and
      (iii) a PD disposed within said pressure housing and optically coupled to said lens, wherein said PD responds to radiation emitted by said IRED and reflected from said borehole environs; and
   (c) said property is determined from said response; wherein:
   (d) a plurality of said reflectance assemblies are disposed on a face of a pad; and
   (e) said responses of each said PD in said plurality of said reflectance assemblies are combined to determine an orientation of said pad with respect to a borehole wall of said borehole environs.

4. Apparatus for measuring a property of a borehole environs, the apparatus comprising:
   (a) a pressure housing that is rotated in a borehole of said borehole environs;
   (b) a window transparent to radiation and hermetically sealed within a wall of said pressure housing;
   (c) at least one IRED disposed within said pressure housing and optically coupled to said window to emit said radiation into said borehole environs;
   (d) at least one focusing lens disposed within said pressure housing, wherein a portion of said emitted radiation is reflected by said borehole environs and passes through said window and through said at least one focusing lens;
   (e) at least one PD which responds to said reflected radiation; and
   (f) said property is determined from said response; wherein;
   (g) multiple responses of said at least one PD are made as said pressure housing is rotated within and conveyed along said borehole;
   (h) said at least one focusing lens is selected to pass radiation reflected by a borehole wall defining said borehole; and
   (i) said multiple responses are combined to form a two dimensional image of said borehole wall.

5. A data conduit for transferring data between a downhole pressure housing and the surface of the earth, the data conduit comprising:
   (a) at least one PD;
   (b) at least one IRED wherein said IRED emits said data as encoded NIR radiation and said PD responds to said NIR encoded radiation;
   (c) a collector assembly;
   (d) a repeater comprising
      (i) at least one additional said IRED,
      (ii) at least one additional said PD, and
      (iii) electronic circuitry and a power source cooperating with said at least one additional IRED and said at least one additional PD; and
   (e) at least one optical fiber operationally connecting said collector assembly and said repeater; wherein
   (f) said collector assembly and said repeater and said at least one optical fiber are hermetically within the wall of a joint of pipe; and
   (g) a plurality of said joints of pipe are operationally connected to form said data conduit.

6. A data conduit for transferring data between a downhole pressure housing and the surface of the earth, the data conduit comprising:
   (a) at least one PD;
   (b) at least one IRED wherein said IRED emits said data as encoded NIR radiation and said PD responds to said NIR encoded radiation;
   (c) a first pressure housing comprising a wall of a borehole tubular, wherein said at least one IRED is optically coupled to a first lens that is hermetically sealed within a wall of said borehole tubular and optically exposed to the interior of said tubular;

(d) a second pressure housing, wherein
  (i) said at least one PD is optically coupled to a second lens and is disposed within said second pressure housing and optically exposed to said interior of said tubular,
  (ii) said second pressure housing is disposed within said interior of said borehole tubular,
  (iii) said second pressure housing is operationally connected to said surface of the earth,
  (iv) said at least one PD is axially and optically aligned with said at least one IRED,
  (v) said data are transferred between said first and said second pressure housings via axially and optically aligned said at least one IRED and said at least one PD, and
  (vi) said data are subsequently transferred to and from said surface of the earth via said second pressure housing thereby forming said data conduit.

7. A data conduit for transferring data between a downhole pressure housing and the surface of the earth, the data conduit comprising:
  (a) at least one PD;
  (b) at least one IRED wherein said IRED emits said data as encoded NIR radiation and said PD responds to said NIR encoded radiation;
  (c) a first pressure housing comprising a wall of a pump down tool, wherein said at least one IRED is optically coupled to a first lens that is hermetically sealed within said wall of said pump down tool;
  (d) a second pressure housing comprising a wall of a fish, wherein
    (i) said at least one PD is optically coupled to a second lens and is disposed within said second pressure housing,
    (ii) said second pressure housing is disposed in the vicinity of said first pressure housing,
    (iii) said second pressure housing is operationally connected to said surface of the earth,
    (iv) said at least one PD is optically aligned with said at least one IRED along an axis parallel to a major axis of a borehole in which both are disposed,
    (v) said data are transferred between said first and said second pressure housings via said optically aligned said at least one IRED and said at least one PD, and
    (vi) said data are subsequently transferred to and from said surface of the earth via said second pressure housing thereby forming said data conduit.

8. Apparatus for determining status of mechanical equipment operating within a borehole, the apparatus comprising:
  (a) at least one reflectance assembly comprising
    (i) a lens hermetically sealed within a wall of a pressure housing,
    (ii) an IRED disposed within said pressure housing and optically coupled to said lens, and
    (iii) a PD disposed within said pressure housing and optically coupled to said lens; and
  (b) a plurality of reflecting encodings disposed outside of said pressure housing and upon said mechanical equipment; wherein
  (c) said PD responds to radiation emitted by said IRED and reflected from said plurality of reflecting encodings; and
  (d) said status is determined from said response.

9. Apparatus for determining properties of fluid within a borehole, the apparatus comprising:
  (a) a first pressure housing disposed within said borehole comprising
    (i) a first lens hermetically sealed within a wall of said first pressure housing, and
    (ii) a PD optically coupled to said first lens; and
  (b) a second pressure housing disposed within said borehole and comprising
    (i) a second lens hermetically sealed within a wall of said second pressure housing, and
    (ii) a IRED optically coupled to said second lens; wherein
  (c) said first and said second lenses are axially aligned;
  (d) said IRED transmits radiation through said borehole fluid intervening between said aligned first and second lenses and into said PD; and
  (e) said properties are determined from response of said PD.

10. A method for measuring a property of a borehole environs, the method comprising:
  (a) providing a pressure housing; and
  (b) providing at least one reflectance assembly comprising
    (i) a lens hermetically sealed within a wall of said pressure housing,
    (ii) an IRED disposed within said pressure housing and optically coupled to said lens, and
    (iii) a PD disposed within said pressure housing and optically coupled to said lens;
  (c) measuring a response of said PD to radiation emitted by said IRED and reflected from said borehole environs; and
  (d) determining said property from said response; and
  (e) contacting a borehole wall of said borehole environs with said lens, wherein resolution of said response is defined by an area of contact between said lens and said borehole wall.

11. The method of claim 10 comprising the additional steps of:
  (a) configuring said pressure housing as a pad;
  (b) disposing a plurality of said reflectance assemblies on a face of said pad;
  (c) determining multiple responses of each PD in said plurality of reflectance assemblies as said pad is conveyed along said borehole wall; and
  (d) said responses are combined to form a two dimensional image of an arc of said borehole wall.

12. A method for measuring a property of a borehole environs, the method comprising:
  (a) providing a pressure housing; and
  (b) providing at least one reflectance assembly comprising
    (i) a lens hermetically sealed within a wall of said pressure housing,
    (ii) an IRED disposed within said pressure housing and optically coupled to said lens, and
    (iii) a PD disposed within said pressure housing and optically coupled to said lens;
  (c) measuring a response of said PD to radiation emitted by said IRED and reflected from said borehole environs;
  (d) determining said property from said response;
  (e) disposing a plurality of said reflectance assemblies on a face of a pad; and
  (f) combining said responses of each said PD in said plurality of said reflectance assemblies to determine an orientation of said pad with respect to a borehole wall of said borehole environs.

13. A method for measuring a property of a borehole environs, the method comprising the steps of:
   (a) rotating a pressure housing in a borehole of said borehole environs;
   (b) hermetically sealing a window transparent to radiation within a wall of said pressure housing;
   (c) disposing at least one IRED within said pressure housing and optically coupling said at least one IRED to said window to emit said radiation into said borehole environs;
   (d) disposing within said pressure housing at least one focusing lens; wherein
      (i) radiation is emitted by said at least one IRED, and
      (ii) a portion of said emitted radiation is reflected by said borehole environs and passes through said window and through said at least one focusing lens, wherein at least one PD responds to said reflected radiation; and
   (e) determining said property from said response.

14. The method of claim 13 comprising the additional steps of:
   (a) measuring multiple responses of said at least one PD as said pressure housing is rotated within and conveyed along said borehole;
   (b) selecting said at least one focusing lens pass radiation reflected by a borehole wall defining said borehole; and
   (c) combining said multiple responses to form a two dimensional image of said borehole wall.

15. The method of claim 13 comprising the additional steps of:
   (a) measuring multiple responses of said at least one PD as said pressure housing is rotated within said borehole;
   (b) selecting said at least one focusing lens pass radiation reflected by a fluid in an annulus defined by an outer wall of said pressure housing and a wall defining said borehole; and
   (c) combining said multiple responses to determine properties of said fluid.

16. A method for transferring data via a data conduit between a downhole pressure housing and the surface of the earth, the method comprising:
   (a) disposing in a wall of a drill pipe operationally connected to said pressure housing at least one PD;
   (b) disposing in said wall of said drill pipe at least one IRED;
   (c) emitting data into said data conduit as encoded NIR radiation from an IRED disposed within said pressure housing; and
   (d) measuring response of said PD to said NIR encoded radiation.

17. A method for transferring data via a data conduit between a downhole pressure housing and the surface of the earth, the method comprising:
   (a) disposing in a wall of a drill pipe operationally connected to said pressure housing at least one PD;
   (b) disposing in said wall of said drill pipe at least one IRED;
   (c) emitting data into said data conduit as encoded NIR radiation from at least one IRED disposed within said pressure housing; and
   (d) measuring response of said PD to said NIR encoded radiation.
   (e) providing a collector assembly;
   (f) providing a repeater comprising
      (i) at least one additional said IRED,
      (ii) at least one additional said PD, and
      (iii) electronic circuitry and a power source cooperating with said at least one additional IRED and said at least one additional PD;
   (g) operationally connecting said collector assembly and said repeater with at least one optical fiber;
   (h) hermetically sealing said collector assembly and said repeater and said at least one optical fiber within the wall of a joint of pipe; and
   (i) operationally connecting a plurality of said joints of pipe to form said data conduit.

18. The method of claim 16 further comprising the steps of:
   (a) providing a first pressure housing comprising a wall of a borehole tubular, wherein said at least one IRED optically coupled to a first lens that is hermetically sealed within said wall of said borehole tubular and optically exposed to the interior of said tubular;
   (b) providing a second pressure housing, wherein said at least one PD is optically coupled to a second lens and is disposed within said second pressure housing and optically exposed to said interior of said tubular;
   (c) disposing said second pressure housing within said interior of said borehole tubular, wherein said second pressure housing is operationally connected to said surface of the earth;
   (d) axially and optically aligning said at least one PD with said at least one IRED;
   (e) transferring said data between said first and said second pressure housings via axially and optically aligned said at least one IRED and said at least one PD; and
   (f) transferring said data to and from said surface of the earth via said second pressure housing.

19. The method of claim 16 further comprising the steps of:
   (a) providing a first pressure housing comprising a wall of a pump down tool, wherein said at least one IRED is optically coupled to a first lens that is hermetically sealed within a wall of said pump down tool;
   (b) providing a second pressure housing comprising a wall of a fish, wherein
      (i) said at least one PD is optically coupled to a second lens and is disposed within said second pressure housing,
      (ii) said second pressure housing is disposed in the vicinity of said first pressure housing,
      (iii) said second pressure housing is operationally connected to said surface of the earth,
      (iv) said at least one PD is optically aligned with said at least one IRED along an axis parallel to a major axis of a borehole in which both are disposed,
      (v) said data are transferred between said first and said second pressure housings via said optically aligned said at least one IRED and said at least one PD, and
      (vi) said data are subsequently transferred to and from said surface of the earth via said second pressure housing thereby forming said data conduit.

20. A method for determining status of mechanical equipment operating within a borehole, the method comprising the steps of:
   (a) providing at least one reflectance assembly comprising
      (i) a lens hermetically sealed within a wall of a pressure housing,
      (ii) an IRED disposed within said pressure housing and optically coupled to said lens, and
      (iii) a PD disposed within said pressure housing and optically coupled to said lens;
   (b) disposing a plurality of reflecting encodings outside of said pressure housing and upon said mechanical equipment; wherein said PD responds to radiation emitted by said IRED and reflected from said plurality of reflecting encodings; and (c) determining said status from said response.

21. A method for determining properties of fluid within a bore, the method comprising the steps of:

(a) disposing a first pressure housing within said borehole, said first pressure housing comprising
   (i) a first lens hermetically sealed within a wall of said first pressure housing, and
   (ii) a PD optically coupled to said first lens; and (b) disposing a second pressure housing within said borehole, said second pressure housing comprising
   (i) a second lens hermetically sealed within a wall of said second pressure housing, and
   (ii) a IRED optically coupled to said second lens; wherein (c) axially aligning said first and said second lenses;

(d) with said IRED, transmitting radiation through said borehole fluid intervening between said aligned first and second lenses and into said PD; and (e) determining said properties from a response of said PD.

* * * * *